UNITED STATES PATENT OFFICE.

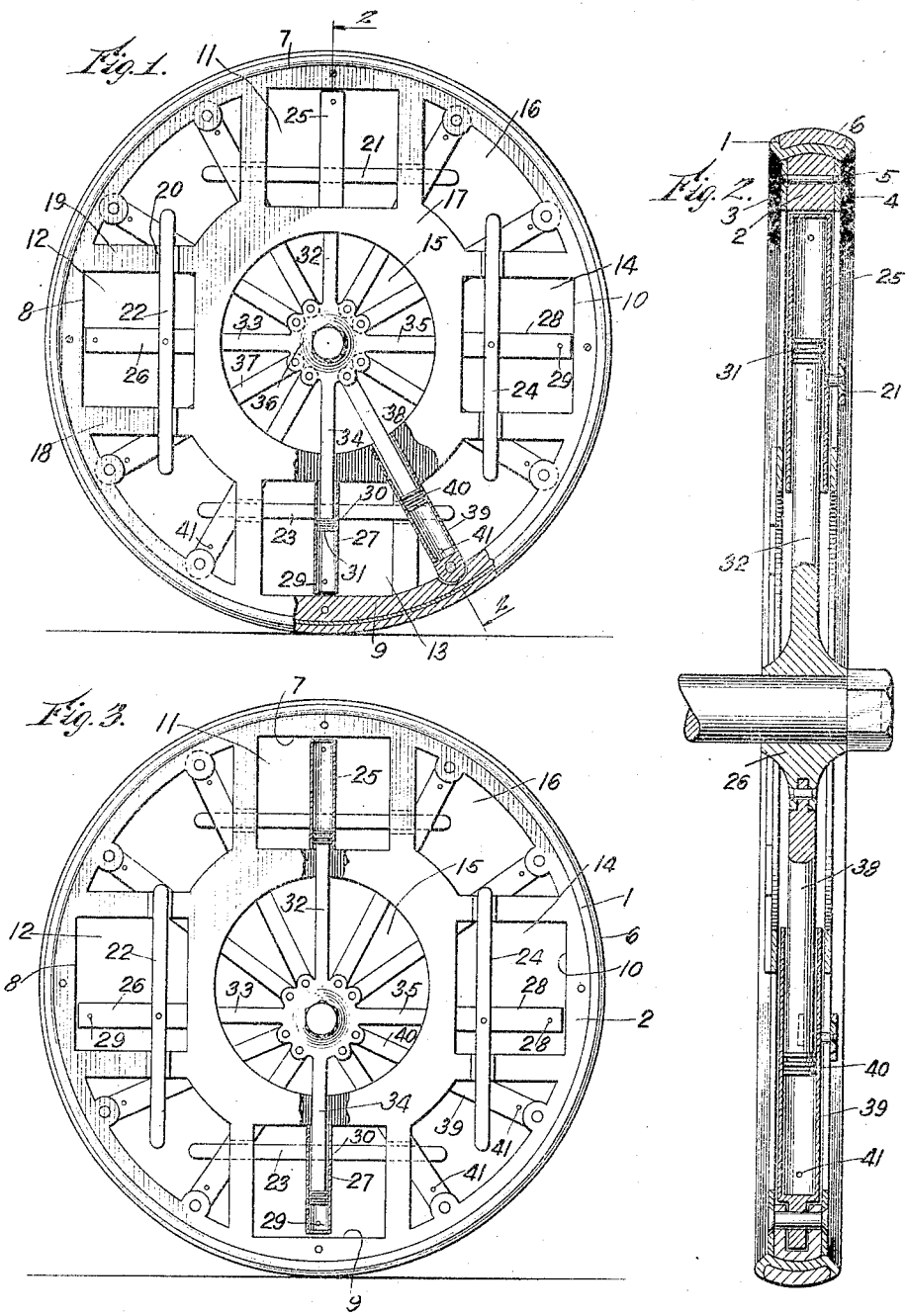

ANTOLIN NIN y MARTINEZ, OF SANTURCE, PORTO RICO.

RESILIENT WHEEL.

1,383,004.	Specification of Letters Patent.	Patented June 28, 1921.

Application filed April 11, 1919. Serial No. 289,399.

*To all whom it may concern:*

Be it known that I, ANTOLIN NIN Y MARTINEZ, a citizen of the United States, and a resident of Santurce, San Juan, Porto Rico, have invented a new and Improved Resilient Wheel, of which the following is a full, clear, and exact description.

This invention relates to resilient wheels and has for an object the provision of an improved construction wherein resiliency is secured through the use of compressed air operating at the end of reciprocating spokes.

Another object in view is to provide a comparatively stiff or rigid rim having hinged or pivoted spokes and means associated with the hub of the wheel which will take up the shocks and resiliently limit the swinging movement of the spokes and the movement of the rim.

A still further object of the invention is the provision of a set of rigid spokes connected to the hub of a wheel and tubular means associated therewith whereby as the spokes move they compress air in the tubes and thereby produce a resilient effect through the action of confined air.

In the accompanying drawings:

Figure 1 is a side view of a wheel disclosing an embodiment of the invention, certain parts being broken away for better illustrating the structure.

Fig. 2 is a sectional view through Fig. 1 on line 2—2, the same being on an enlarged scale.

Fig. 3 is a view similar to Fig. 1 with the parts shown in a different position and with certain parts broken away for better showing the action of the pushing members.

Referring to the accompanying drawing by numerals 1 indicates an annular rim of metal or any desired material which is provided with a felly 2 of wood or other material to which the metallic side plates 3 and 4 are secured. These plates may be secured in any suitable manner. as for instance by screws or bolts 5. A rubber cushioning member 6 is arranged in the outer part of the rim 2. The felly 2 and the side plates 3 and 4 are circular except at the four points 7, 8, 9 and 10 where they are flat, the flat portions 7 and 9 being parallel and also the flat portions 8 and 10 being parallel, but extending at right angles to the flat portions 7 and 9. Plates 3 and 4 cover the opposite sides of the wheel, but are cut away for producing substantially square openings 11, 12, 13 and 14 and a round opening 15 in the center as well as a number of irregular shaped openings 16 between the square openings whereby each side of the square opening is provided with a leg merging into the central circular body 17. The various legs 18 and 19 on the opposite sides of the square openings contain guideways 20 which may be a dovetail structure or an inclosed guide as preferred, in which the various guiding plates 21, 22, 23 and 24 fit, there being one guiding plate for each of the square openings. These guiding plates are connected to tubular members 25, 26, 27 and 28 respectively, said tubular members being closed at the outer ends though provided with a small vent 29 at said ends and an air-inlet 30 near their inner ends. These tubes are all identical and accommodate the piston 31 of the respective spokes 32, 33, 34 and 35, which spokes are rigidly secured to the hub 36 of the wheel. The other spokes 37 are pivotally connected with the hub 36 and also pivotally connected to the plates 3 and 4 whereby the rim may move freely to a limited extent, but cushioned by the action of the rigid spokes and pistons 31 acting in the cushioning tubes 25 to 28 inclusive. For instance, when the parts move downwardly from the position shown in Fig. 1 to that shown in Fig. 3 air is compressed in tube 27 and thereby produces the cushioning effect while the tubes 26 and 28 move downwardly in a vertical direction guided by the plates 22 and 24.

In order to permit this movement the various spokes 37 are made in two parts so that the inner section 38 telescopically fits into the outer tubular section 39. Preferably a piston 40 is arranged at the outer end of section 38 so as to create a better compression. An air vent 41 is provided near the tubular section 39 for permitting the air to escape. It will thus be seen that the hinged or pivotally mounted spoke will produce a cushioning effect as well as the rigid spokes, as the hub moves or rather as the rim moves in respect to the hub. When the wheel is standing still the parts are in the position shown in Fig. 3, but as the wheel moves faster and faster the compressed air in the section 39, tubes 25 to 28 inclusive will be more and more compressed by reason of the restricted outlets 29 and 41 so that the hub may gradually assume an almost central position and the weight will be carried by the compressed air in the various tubular sections and tubes so that any shocks on the wheels will be taken up by the compressed air and not transmitted to the vehicle supported by the hub.

What I claim is:

1. A resilient wheel, comprising a rim, side members secured to the rim, a hub, spokes rigid with the hub and having pistons at their ends, tubular members slidably mounted on the side members and in which the said spokes with their pistons work, and sectional spokes between the rigid spokes and slidable one upon the other, one section being pivoted to the hub and the other section to the rim.

2. A resilient wheel, comprising a rim, side members secured to the rim, a hub, spokes rigid with the hub and having pistons at their ends, tubular members slidably mounted on the said members and in which the said spokes with their pistons work, and sectional spokes between the rigid spokes, the inner sections being pivoted to the hub and having pistons at their ends, the outer sections being tubular and pivoted to the rim and in which the inner sections work.

3. A resilient wheel, comprising a rim having a plurality of flat portions on its inner face, side plates secured to the rim, a hub, spokes rigid with the hub and having pistons at their ends, tubular members carried by the side plates opposite the flat portions of the rim, said tubular members having sliding movement on said plates and in which the said spokes and their pistons work, said tubular members being adapted to engage the flat portions of the rim, and cushioning means between the hub and rim intermediate of the said spokes.

4. A resilient wheel, comprising a rim having a plurality of flat portions on its inner face, side plates secured to the rim and having guide-ways opposite the flat portions of the rim, a hub, spokes rigid with the hub and having pistons, guide members slidable in the guideways, apertured tubular members secured to the guide members and in which the said spokes with their pistons work, said tubular members being adapted to engage the flat portions of the rim, and cushioning means between hub and rim intermediate of the said spokes.

ANTOLIN NIN y MARTINEZ.